(12) United States Patent
Fuertes et al.

(10) Patent No.: US 6,531,592 B1
(45) Date of Patent: Mar. 11, 2003

(54) PROCESS FOR MODIFYING STARCHY MATERIALS IN THE DRY PHASE

(75) Inventors: Patrick Fuertes, Lambersart (FR); Anne Lambin, Lomme (FR); Jean-Louis Dreux, Estaires (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 09/563,036

(22) Filed: May 1, 2000

(30) Foreign Application Priority Data

May 3, 1999 (FR) .............................. 99 05604

(51) Int. Cl.[7] .................. C08B 35/00; C08B 3/30; C08B 31/00; A61K 47/00; C13K 1/06
(52) U.S. Cl. .................. 536/47; 536/81; 536/102; 536/105; 514/778; 127/38
(58) Field of Search .............. 536/47, 102, 105, 536/81; 514/778

(56) References Cited

U.S. PATENT DOCUMENTS

| | | |
|---|---|---|
| 2,868,780 A | 1/1959 | Minkema et al. ......... 260/233.5 |
| 3,479,220 A | 11/1969 | Ferrara et al. ................ 127/38 |
| 3,661,895 A | 5/1972 | Germino et al. ............ 106/213 |
| 3,692,581 A | 9/1972 | Ferrara et al. ............ 260/233.5 |
| 3,705,046 A | 12/1972 | Speakman et al. ......... 106/213 |
| 3,778,431 A | 12/1973 | Kightlinger et al. ..... 260/233.3 |
| 3,884,909 A | 5/1975 | Kightlinger et al. ..... 260/233.3 |

FOREIGN PATENT DOCUMENTS

| | | | |
|---|---|---|---|
| DE | 266497 | * | 4/1989 |
| EP | 0 710 670 | | 5/1996 |
| JP | 09012602 | * | 1/1997 |
| WO | WO97/13788 | | 4/1997 |

OTHER PUBLICATIONS

Klaushofer H., Die Stärke, 1978, vol. 30, n°2, pp 47–51.
Klaushofer H., Die Stärke, 1983, vol. 35, n°7, pp 237–242.
Wing E. , Die Stärke, 1996, vol. 48, n°178, pp 275–279.
Database WPI, Derwent publications, XP 002127039, 1985.

* cited by examiner

*Primary Examiner*—Zohreh Fay
*Assistant Examiner*—Brian-Yong Kwon
(74) *Attorney, Agent, or Firm*—Sturm & Fix LLP

(57) ABSTRACT

The subject of the invention is a process for modifying amylaceous (starchy) materials comprising a stage of chemical fluidification and a stage of stabilization, simultaneous or not simultaneous, these two stages being performed in the dry phase and by the use of a plycarboxylic organic acid. The acid can be chosen particularly from among citric acid, adipic acid, azelaic acid and their mixtures. The process is advantageously performed at a temperature between 90° C. and 170° C., at a pH below 4 and during a total period between 3 minutes and 8 hours. The starchy material subjected to fluidification and stabilization can be cationic.

16 Claims, No Drawings

PROCESS FOR MODIFYING STARCHY MATERIALS IN THE DRY PHASE

CROSS-REFERENCE TO RELATED APPLICATIONS

The subject of the present invention is a process for modifying amylaceous (starchy) materials comprising stages of chemical fluidification and of stabilisation performed in the dry phase. It is also aimed at modified starchy materials obtained according to this process, certain of which materials constitute moreover novel industrial products. Finally it concerns the industrial uses of these modified starchy materials.

DETAILED DESCRIPTION OF THE INVENTION

"Chemical fluidification" is understood here to mean any operation consisting of subjecting a starchy material to the hydrolysing action of a chemical agent, for example an acid or (per)oxidant compound, it being possible to use the said agent in a liquid, solid and/or gaseous form.

"Chemical fluidification in the dry phase" is understood here to mean a chemical fluidification as defined above, carried out within a reaction mixture (including starchy material) whose moisture content is in practice less than about 25%, preferably between about 6 and 22%.

The dry phase techniques are distinguished from the methods in aqueous medium, which involve a much more dilute reaction medium using a starch milk having a dry matter content generally not exceeding 35 to 40%.

However, these fluidification methods in aqueous medium involve the use of an additional filtration stage, which has the disadvantage of causing substantial losses of soluble materials, mainly of damaged starch granules, of solubilised starch molecules and of salts formed during the prior neutralisation of the fluidified starch. This manifests itself in turn as a reduction in the yields of fluidified starchy materials and by an increase in the pollutant burden of the effluents.

These disadvantages contributed to research and the perfection of techniques for chemical fluidification in the dry phase. Thus the patents U.S. Pat. Nos. 3,479,220 and 3,692,581 describe a process for the chemical fluidification of starchy materials (starch flours, meals) by contacting these materials, at ambient temperature (≈25° C.), with a concentrated inorganic acid placed on a finely divided dry, inert support.

EP Patent 710.670 describes a continuous chemical modification process according to which a starch powder and a modifying agent, for example a hydrolysing agent such as hydrochloric acid, are introduced simultaneously into a special reactor ("turbo-reactor") whose spiral enables the creation by centrifugation, semi-instantaneously, of a fine, dynamic and highly turbulent liquid layer of an intimate mixture between the particles of starch and the chemical agent.

The patent application WO 97/13788 describes in general terms a process for the chemical fluidification of starches carried out continuously in the dry phase involving the mandatory use of, among other things, a reactor of the piston type ("plug flow reactor") and of reaction temperatures at most equal to 77° C. (170° F.).

This patent recommends a very wide range of chemical agents with hydrolysing activity, the preferred agents being hydrochloric acid, particularly in the gaseous form, and sulphuric acid. However, this document does not actually describe any specific example of the preparation of a fluidified starch.

In any case, whether they are operated in an aqueous medium or in the dry phase, chemical fluidification techniques enable the preparation of modified products displaying commonly sought-after physico-chemical properties such as:
- a reduced intrinsic viscosity and hot viscosity, the hot viscosity being evaluated by the classical measurement of the fluidity in water ("Water Fluidity" or WF),
- an increased hot solubility, and
- an increased gel strength ("gel strength") and film-forming ability ("film strength").

One of the main techno-economic advantages of chemically fluidified starchy materials consists of their ability to be used and treated, particularly to be cooked, to materials with a very high matter content.

This is because of the fact that their viscosity is greatly reduced compared to the native products. This ability manifests itself as energy savings (smaller volumes of water to be removed) and technological benefits that are widely turned to good account in industry. Nonetheless, whatever their production process, chemically fluidified starchy materials generally have the disadvantage that they form sizes that are not very stable, and particularly sizes that show a very significant increase in viscosity when cooled down and/or when stored for a prolonged time. This instability often manifests itself in an irreversible phenomenon of gelatinization or retrogradation.

This is the reason why chemical fluidification techniques are generally associated with stabilisation reactions, particularly with esterification, etherification or oxidation reactions, in order to make the fluidified starchy materials usable industrially. This may involve in particular reactions of acetylation, hydroxypropylation or oxidation by hypochlorite solution. Although these techniques are effective, they have the disadvantage of forming a large amount of organic and/or saline pollution. Other methods are aimed at combining the chemical fluidification techniques with cross-linking reactions.

Thus U.S. Pat. No. 3,705,046 describes the cross-linking, in the aqueous phase, of a starch, native or cationic, by the use of paraformaldehyde, this being done at the same time as or after its fluidification by hydrochloric acid. The crosslinked/fluidified starch obtained is said to have very good stability and can be used advantageously for coating textile or papermaking fibres.

U.S. Pat. No. 3,661,895 describes the preparation, for the same purposes, of a starch that is successively fluidified, cross-linked and then treated with a polycarboxylic acid anhydride, all of the operations being carried out in aqueous medium.

The U.S. Pat. Nos. 3,778,431 and 3,884,909 describe the cross-linking, in the aqueous phase, of a native or cationic maize starch by the use of a cross-linking agent such as 1,3-dichloro-2-propanol, 1,4-dichlorobutene-2 or epichlorhydrin, this being done following its fluidification by hydrochloric acid, again in aqueous medium.

However, such processes have or indeed exacerbate the above-mentioned disadvantages that are inherent with processes in the aqueous phase (reduction of yields, increase of pollutant burdens). These processes also have the disadvantage of being complicated and in particular of involving the use of two different agents, namely one fluidification agent and one cross-linking agent, this generally taking place during two different stages, themselves separated by intermediate treatments.

For their part, the much more recent patents EP 710.670 and WO 97/13788 mentioned above are not concerned specifically with combining a fluidification stage with a cross-linking stage, except that document WO 97/13788 mentions, in a manner not described in detail, the possibility that the starch subjected to the fluidification ("starch source") had previously been modified by agents such as epichlorhydrin or phosphorus oxychloride (cf. page 3, lines 9–25 of the aforesaid document).

DETAILED DESCRIPTION OF THE INVENTION

It emerges from the foregoing that to the Applicant's knowledge there does not exist any means of preparing a fluidified and stabilised starchy material, namely a means that simultaneously:

- is simple and particularly does not involve the compulsory use of several agents and/or of several stages of chemical modification,
- allows the industrial production of products having good stability to cooling and/or during prolonged storage,
- is applicable to starchy materials of very varied nature or intended to be subjected afterwards to very varied chemical or physical modifications,
- is economical and in particular allows the achievement of good yields of fluidified starchy materials, and
- produces little pollutant or none at all, and in particular does not cause substantial losses of soluble materials into effluents.

Applicants have discovered, after numerous studies, that such a means can consist of the particular combination of a fluidification stage and a stabilisation stage, the two stages each being performed a) in the dry phase and b) by using an agent chosen from among the polycarboxylic organic acids.

More precisely, the subject of the present invention is a process for modifying a starchy material characterised in that it comprises:

- a chemical fluidification stage during which the starchy material is subjected, in the dry phase, to the hydrolysing action of an agent chosen from among the polycarboxylic organic acids and their mixtures such that the said starchy material displays a fluidity in water (WF) at least equal to 10, preferably at least equal to 45, et
- a stabilisation stage, simultaneous with or not simultaneous with the said fluidification stage, during which the starchy material is subjected, again in the dry phase, to the stabilising action of an agent again chosen from among the polycarboxylic organic acids and their mixtures.

The term "stabilisation stage" is understood to mean in particular any means or procedure, physical and/or chemical, capable of improving the stability to cooling and/or to storage of the starchy material, in particular capable of cross-linking, to a greater or lesser extent, the said material.

According to an advantageous variant, this process is characterised in that each of the agents used during the stages of fluidification and of stabilisation is chosen from among the dicarboxylic organic acids, the tricarboxylic organic acids and any mixtures of at least any two of the said acids, preferably chosen from among citric acid, acids of the general formula $HOOC-(CH_2)_n-COOH$ where n lies between 3 and 8 and any mixtures of at least any two of the aforesaid acids.

It can involve in particular adipic acid (n=4) or azelaic acid (n=7), suberic acid (n=6) or sebacic acid (n=8).

For example when using organic acids such as citric, adipic or azelaic acids, this process allows a starchy material to be obtained that is simultaneously stabilised and substantially fluidified, and this is done by the use of only one single modification agent.

Consequently the process that is the subject of the invention can also be characterised in that the starchy material is subjected simultaneously to stages of fluidification and of stabilisation by the action of citric acid, adipic acid, azelaic acid, suberic acid, sebacic acid, or any mixture of at least two of these acids.

In the context of the present invention, the term "simultaneously" must not be regarded as restrictive but as excluding solely the situation in which the stage of fluidification on the one hand and the stage of stabilisation on the other hand do not have any contemporaneity whatsoever, not even just a few minutes. This term "simultaneously" includes the situations in which:

- the two stages begin at the same time but one finishes before the other, or
- the two stages do not start at the same time but end at the same time, or
- one stage proceeds entirely after the other has started but before the other has finished, or
- one stage starts after the other has started but before the other has finished.

A recommendation has already been made for the stabilisation, by esterification or cross-linking, of a starch by using respectively:

- in the aqueous phase, ammonium salts of citric acid as described in the U.S. Pat. No. 2,868,780, or
- in the dry phase, sodium or calcium salts of citric acid, possibly formed in situ in the reaction medium, as described by H. KLAUSHOFER et al. in "Die Stärke (Starch) 30 (1978) No. 2, pp. 47–51".

Characteristically, these processes are carried out at relatively high reaction pH values, in any case at least equal to 4, because these authors are aiming in particular to minimise and if possible completely avoid any hydrolysis of the starch. Moreover these processes involve the use of relatively large amounts of the aforesaid salts, namely generally greater than 5%, expressed as citric acid/starch (dry/dry).

It emerges from a later article by H. KLAUSHOFER ("Die Stärke (Starch) 35 (1983) No. 7, pp. 237–242") that such products may have levels of fixed citric acid of the order of 1.33 to 3.18%.

More recently, E. WING et al. ("Die Stärke (Starch) 48 (1996) No. 7/8, pp. 257–279") described the preparation of starch citrates usable as ion exchangers, this being under conditions aimed at optimising the fixation yield of citric acid while at the same time minimising the unwanted effects, firstly of cross-linking and secondly of hydrolysis. The adjustment of the pH to a value of 8.3 with the aim of avoiding any fluidification of the starch and the adjustment of the temperature to a value below 140° C. to limit any cross-linking is recommended.

As far as the Applicant knows, no one has ever described or even suggested the use, particularly in the dry phase, of an acid to allow simultaneously the substantial fluidification and the stabilisation of the starchy material.

In this case "substantial fluidification" is understood to mean a treatment able to confer on the starchy material a fluidity value in water (WF) at least equal to about 10, preferably at least equal to about 45. The idea of "stabilisation" was defined above. In an advantageous manner, this stabilisation should allow a reduction of the "S Index" of the starchy material as will be defined hereafter and, if possible, the attainment of values at most equal to 10 for the said index when measured on fluidified starchy materials having a WF comprised between about 60 and 90.

This double modification, simultaneous or not simultaneous, of the starchy material by substantial fluidification and stabilisation was even less obvious since it is known, including the state of the prior art, that each of these modifications requires different conditions in the medium (in particular of temperature, pH, humidity and concentration of acid), even in opposite directions, in order to take place to a substantial extent.

According to one variant of the process according to the invention, the latter is characterised in that there is used, in order to fluidify and stabilise the starchy material, a total amount of polycarboxylic organic acid(s) lying between about 0.05 and about 5%, preferably between 0.5 and 4%, these percentages being expressed as dry weight of polycarboxylic organic acid(s) relative to the dry weight of starchy material.

The acids can be used equally well in the form of solid or of liquid, more or less concentrated.

By way of example adipic acid, because of its low solubility in water, can be mixed dry with the starchy material, and citric acid can be sprayed onto the said material in the form of an aqueous solution of about 50% All that is necessary is that any water that may possibly be introduced by the acid in solution is in a quantity sufficiently small for the reaction medium to remain a dry phase within the meaning of the invention.

In an advantageous manner, the process claimed here is characterised in that the stages of fluidification and of stabilisation are performed:

at a temperature lying between about 90° C. and about 170° C., preferably lying between 100° C. and 150° C., and during a total period lying between about 3 minutes and about 8 hours, preferably lying between 5 minutes and 6 hours.

The term "starchy material" in the sense of the present invention is understood to mean the totality of the native starches, of natural or hybrid origin, including those originating from mutations or genetic manipulations, together with the totality of the modified starches originating from the chemical and/or physical modification, in one or several stages, of the said native starches. In particular the starches, native or modified, can originate from potatoes, potatoes with a high amylopectin content (waxy potatoes), maize, wheat, maize with a high amylose content, rice, peas or manioc, cuts or fractions that can be made or obtained such as amylose, amylopectin, granulometric cuts known to the person skilled in the art as wheat starch "A" and wheat starch "B", and any mixtures of at least any two of the aforesaid products. The starchy materials usable according to the invention can also consist of meals or other mixtures containing vegetable starch(es) and protein(s), the "starch(es)" component being in the majority, as well as products originating from the chemical and/or physical modification, in one or more stages, of the said meals and the said mixtures.

According to one variant, the process of modification of starchy materials according to the invention is characterised in that the starchy material subjected to stages, possibly simultaneous, of chemical fluidification and stabilisation is chosen from among the native starches and the meals as well as the products resulting from the etherification, esterification, sulphonation, oxidation and/or plasticising, and in particular from the cationisation, hydroxyalkylation or acetylation of the said starches and the said meals In particular, the Applicant Company has discovered that the said starchy materials can advantageously consist of a cationic starch.

According to another variant, the process of the invention is characterised in that the stages of fluidification and of stabilisation are performed at a pH below about 4.0, preferably lying between 1.5 and 3.5, the said pH being measured on a sample of the reaction medium suspended in demineralised water at a concentration of 35%.

Such pH values constitute another characteristic of the said process, distinguishing fundamentally from those described in the U.S. Pat. No. 2,868,780 and the articles by KLAUSHOFER and WING mentioned above.

Furthermore, the process of the invention has the merit of being performable on non-specific apparatus, and particularly on agitated reactors of the plug flow type with a great diversity of geometries, dimensions and modes of operation, including those described in the above-mentioned patents EP 710 670 and WO 97/13788.

Consequently, from now on there is available a new means, which is particularly simple, inexpensive and efficient, for obtaining fluidified and stabilised starchy materials displaying large ranges of physico-chemical and applications-related properties.

These starchy materials generally have an "S Index" that is relatively small, that is to say at most equal to about 10, the said index being inversely proportional to the stability to cooling of the said materials. More precisely, the S Index of a starchy material is equal to the ratio between the BROOKFIELD viscosity at 20° C. and 100 revolutions per minute (hereafter "V 20° C.") and the viscosity at 80° C. and 100 revolutions per minute ("V 80° C.") of the starchy material when in the form of a size with 15% of dry material (MS) obtained starting from a suspension having an initial MS of 25%, cooked for a period of 3 minutes in a jet cooker at 145° C. and diluted to an MS of 15%.

Among other things, the modification process according to the invention enables the preparation of products displaying simultaneously:

a fluidity in water (WF) lying between about 50 and about 90, and an S Index as defined above at most equal to about 10.

In particular, it enables the modification of starchy materials other than native waxy maize starches into products displaying simultaneously a fluidity in water (WF) lying between about 65 and about 90, and an S Index lying between about 2 and 7.

As far as the Applicant knows, products obtained in the dry phase and characterised in this way constitute novel industrial products that can be used advantageously in the operations of coating or surfacing paper, sizing or finishing textiles, especially as film-forming, binding, fibre fixing and/or water-retaining agents. These novel fluidified/stabilised starchy materials can also be used as texturing agents, in particular as viscosifiers or thickeners, in the preparation of gums or gelatinised food, pharmaceutical or cosmetic products, or as adhesives in the manufacture of plaster boards or corrugated cardboard boards.

Because of the conditions under which it is used, in particular the nature and quantity of acid used and the humidity and pH of the reaction medium, the process according to the invention also allows the preparation of products having simultaneously a fluidity in water (WF) that is relatively high, i.e. at least equal to about 45, and a level of fixed polycarboxylic organic acid(s) that is relatively low, i.e. at most equal to about 1%, expressed as dry weight of polycarboxylic organic acid(s), in the form of acid and/or salt(s), relative to the dry weight of the starchy material.

As far as the Applicant knows, products characterised in this way also constitute novel industrial products, and they do so independently of the process used to obtain them. They can be used advantageously in the functions and applications mentioned above.

As a consequence of this, the subject of the present invention also includes a novel starchy material characterised in that it displays simultaneously:
- a fluidity in water (WF) at least equal to about 45, preferably lying between 50 and 90, and
- a content of fixed polycarboxylic organic acid(s) lying between about 0.01% and about 1%, preferably lying between 0.05% and 0.9%.

The totality of the starchy materials described above can in addition advantageously be cationic (including amphoteric) and can display, for example, a fixed nitrogen level lying between about 0.1 and 3% (dry/dry).

The present invention will be described in more detail using the following examples, which are not in any way limiting.

EXAMPLE 1

In this Example, a native starchy material is modified according to the process that is the subject of the invention by using, in the dry phase, citric acid as the polycarboxylic organic acid.

Into a high-speed mixer there is placed 40 kg of a native maize starch with a humidity of 13% of water together with about 700 g of a solution of 50% citric acid such that the ratio by weight, dry/dry, of citric acid relative to the starch is about 1%.

The acidified mixture obtained (pH<3) is dehydrated to a humidity value of about 8% and then put into a stirred reactor of the LODIGE type heated to a temperature of about 115° C.–120° C. After 50 minutes of reaction, the modified product obtained is taken out of the reactor and neutralised with a solution of calcium carbonate, this operation also enabling the said product to recover its initial level of humidity.

Measurement of the fluidity in water (WF) of this product gives a value of 72, which represents a very substantial fluidification of the material.

The stability of this product was determined by studying, at different temperatures, the BROOKFIELD viscosity (rotation speed: 100 rev./minute) of a size with 15% dry material (MS) obtained by starting with an initial MS of 25% cooked for 3 minutes in a jet cooker (145° C.) and diluted.

The results obtained show the very high stability of this product, whose viscosity increases in a regular and limited manner between 80° C. (viscosity=52 mpa.s) and 20° C. (620 mPa.s).

Under the same conditions of preparation and evaluation of the size, a maize starch fluidified by HCl in the milk phase (WF≈80) but not stabilised shows a large increase in viscosity between 80° C. (45 mpa.s) and 20° C. (5300 mPa.s).

Moreover, a treatment test at 55° C. and in the aqueous phase of a maize starch (milk containing 37.5% of MS) with 5% citric acid (dry/dry) showed that it was not possible, even after 26 hours of reaction, to obtain a product having a fluidity in water (WF) at least equal to 35.

This product does not have fixed citrate functions, whereas the product described above, obtained according to the invention, has a citric acid content, fixed in the form of salts, de 0.35%, expressed as dry citric acid/dry weight of product.

This EXAMPLE 1 shows that the process of the invention enables, in an simple and not very expensive manner, the very substantial stabilisation and fluidification of a native starchy material and that this can be done by the use of a relatively small amount of a single chemical agent, in this case 1% of citric acid.

EXAMPLE 2

In this example, a native maize starch is modified according to the process that is the subject of the invention by reaction in the dry phase with, respectively:
- TEST A: 2.5% citric acid (dry/dry) during 20 minutes at about 102° C.,
- TEST B: 2.5% citric acid (dry/dry) during 30 minutes at about 102° C.,
- TEST C: 2.5% adipic acid* (dry/dry) during 2 hours 30 minutes at about 127° C.,
- TEST D: 2.5% adipic acid* (dry/dry) during 5 hours at about 127° C.

* used in the form of powder.

Control experiments were carried out by fluidification, in the dry phase and by HCl, of a previously cross-linked maize starch, in the milk phase, by using 0.6% of sodium trimetaphosphate ("TMPS"). This fluidification is carried out by reaction with, respectively;
- TEST T1: 0.13% hydrochloric acid (dry/dry) during 30 minutes at about 72° C.,
- TEST T2: 0.13% hydrochloric acid (dry/dry) during 45 minutes at about 72° C.

Measurements are made of the fluidity in water (WF) and of the viscosity at 20° and at 80° C. of the products obtained, this being done according to EXAMPLE 1, as well as the ratio V 20° C./V 80° C. or S Index as defined above.

The results are summarised below.

| TEST | WF | V 20° C. | V 80° C. | INDEX S |
|------|----|---------|---------|---------|
| T1 | 67 | 7300 | 80 | >90 |
| T2 | 76 | 1560 | 51 | 30.6 |
| A | 67 | 250 | 58 | 4.3 |
| B | 75 | 224 | 52 | 4.3 |
| C | 61 | 620 | 70 | 8.9 |
| D | 77 | 164 | 47 | 3.5 |

Overall, these results show that at an almost identical level of fluidification, the starchy materials modified according to the invention have a stability to cooling very much higher than that measured for starches treated with a classical cross-linking agent such as TMPS.

Like citric acid, adipic acid turns out to be a fluidification and stabilisation agent that is highly effective in the dry phase.

EXAMPLE 3

In this example a cationic maize starch (cationisation in the milk phase) having a fixed nitrogen content of about 0.16% is modified by reaction, in the dry phase, with 1.0% of citric acid monohydrate (dry/dry) during 65 minutes at about 125° C.

The fluidified/stabilised maize starch obtained has the following characteristics, measured as described above:

WF: 67
V 20° C.: 304 mPa.s
V 80° C.: 71 mPa.s
S Index: 4.3

In a control experiment the same cationic maize starch is fluidified in the milk phase but by reaction with 1.0% of hydrochloric acid (dry/dry) during 510 minutes at about 52° C.

The modified starchy material that is obtained has the following characteristics:

WF: 68
V 20° C.: 1000 mPa.s
V 80° C.: 64 mPa.s
INDEX S: 15.6

These results show that the process of the invention is particularly well suited for the modification of cationic starches. They confirm that at equal levels of cationisation and of fluidification, a starchy material obtained according to the invention has a stability to cooling that is significantly higher than that measured for the same original material but treated with a classical fluidification agent such as HCl.

In this example, native corn starch is transformed according to the process described in example 1, except that:

1) the starch is mixed with 2.5% by weight (dry/dry) citric acid and 0.04% by weight (dry/dry) hydrochloric acid,
2) the acidified mixture thus obtained is transformed, without prior dehydration, in a turbo drying type reactor such as described in the precited patent EP 710 670,
3) the temperature of the thermic fluid is 150° C., and
4) the reaction time is of about 3 minutes.

The product thus obtained has a fluidity in water (WF) of 72 and an S Index of 3.5.

Furthermore this product has a remarkable stability upon storage. Stored 24 hours at 25° C., it does not gelify and 24 hours at 50° C., it does not significantly increase in viscosity.

This example shows that the process according to the invention can advantageously be used in the present also of a small amount of strong acid such as hydrochloric acid.

What is claimed is:

1. A process for modifying an amylaceous (starchy) material comprising:
    a chemical fluidification stage during which the starchy material is subjected, in a dry phase, to the hydrolysing action of an agent chosen from among the polycarboxylic organic acids and their mixtures, such that said starchy material displays a fluidity in water (WF) at least equal to 10 and
    a stabilisation stage, simultaneous with said fluidification stage, during which the starchy material is subjected, again in the dry phase, to the stabilising action of an agent again chosen from among polycarboxylic organic acids and their mixtures, and wherein the stages of fluidification and of stabilisation are performed at a pH less than about 4.0,
    the total quantity of organic polycarboxylic acid(s) being comprised between about 0.05 and about 5%, these percentages being expressed as dry weight of the polycarboxylic organic acid(s) relative to the dry weight of the starchy material.

2. Process according to claim 1 wherein each of the agent used during the fluidification and stabilisation stages is selected from the group consisting of dicarboxylic organic acids, tricarboxylic organic acids and any mixtures of at least any two of said acids.

3. Process according to claim 1 wherein the starchy material is subjected simultaneously to the stages of fluidification and of stabilisation by the action of citric acid, adipic acid, azelaic acid, suberic acid, sebacic acid or any mixture of at least two of these acids.

4. Process according to claim 1 wherein the stages of fluidification and of stabilisation are performed:
    at a temperature between about 90° C. and about 170° C. and
    during a total period between about 3 minutes and about 8 hours.

5. Starchy material other than a native waxy maize starch, obtained according to claim 1, simultaneously having:
    a fluidity in water (WF) between about 65 and about 90, and
    an S index between about 2 and about 7.

6. Starchy material obtained according to claim 1, simultaneously having:
    a fluidity in water (WF) at least equal to about 45 and
    a content of fixed polycarboxylic organic acid(s) between about 0.01% and about 1%, this percentage being expressed as dry weight of fixed polycarboxylic organic acid(s), in the form of acid and/or salt(s), relative to the dry weight of the starchy material.

7. Starchy material according to claim 5, wherein said starchy material is cationic.

8. The process according to claim 1, wherein said starchy material displays a fluidity in water (WF) at least equal to 45.

9. The process according to claim 2, wherein said acids are selected from the group consisting of citric acid, acids of the general formula HOOC—$(CH_2)_n$—COOH where n is comprised between 3 and 8, and any of their mixtures.

10. The process according to claim 1, wherein a total quantity of organic polycarboxylic acid(s) being comprised between about 0.5 and about 4%, these percentages being expressed as dry weight of the polycarboxylic organic acid(s) relative to the dry weight of the starchy material.

11. The process according to claim 4, wherein the stages of fluidification and of stabilisation are performed:
    at a temperature between about 100° C. and about 150° C., and
    during a total period between about 5 minutes and about 6 hours.

12. The process according to claim 1, wherein the stages of fluidification and of stabilisation are performed at a pH between about 1.5 and about 3.5.

13. A starchy material according to claim 6, simultaneously having:
    a fluidity in water (WF) between 50 and 90, and
    a content of fixed polycarboxylic organic acid(s) between 0.05% and 0.9%, these percentages being expressed as dry weight of fixed polycarboxylic organic acid(s), in the form of acid and/or salt(s), relative to the dry weight of the starchy material.

14. The starchy material according claim 6, wherein said starchy material is cationic.

15. The starchy material obtained according to claim 1, wherein said starchy material is cationic.

16. The process according to claim 1, wherein the dry phase means that the starchy material is within a reaction mixture which has a moisture content of between about 6 and 22%.

* * * * *